No. 730,757. PATENTED JUNE 9, 1903.
I. B. GALBREATH.
ROASTING OVEN.
APPLICATION FILED DEC. 15, 1902.
NO MODEL. 2 SHEETS—SHEET 1.
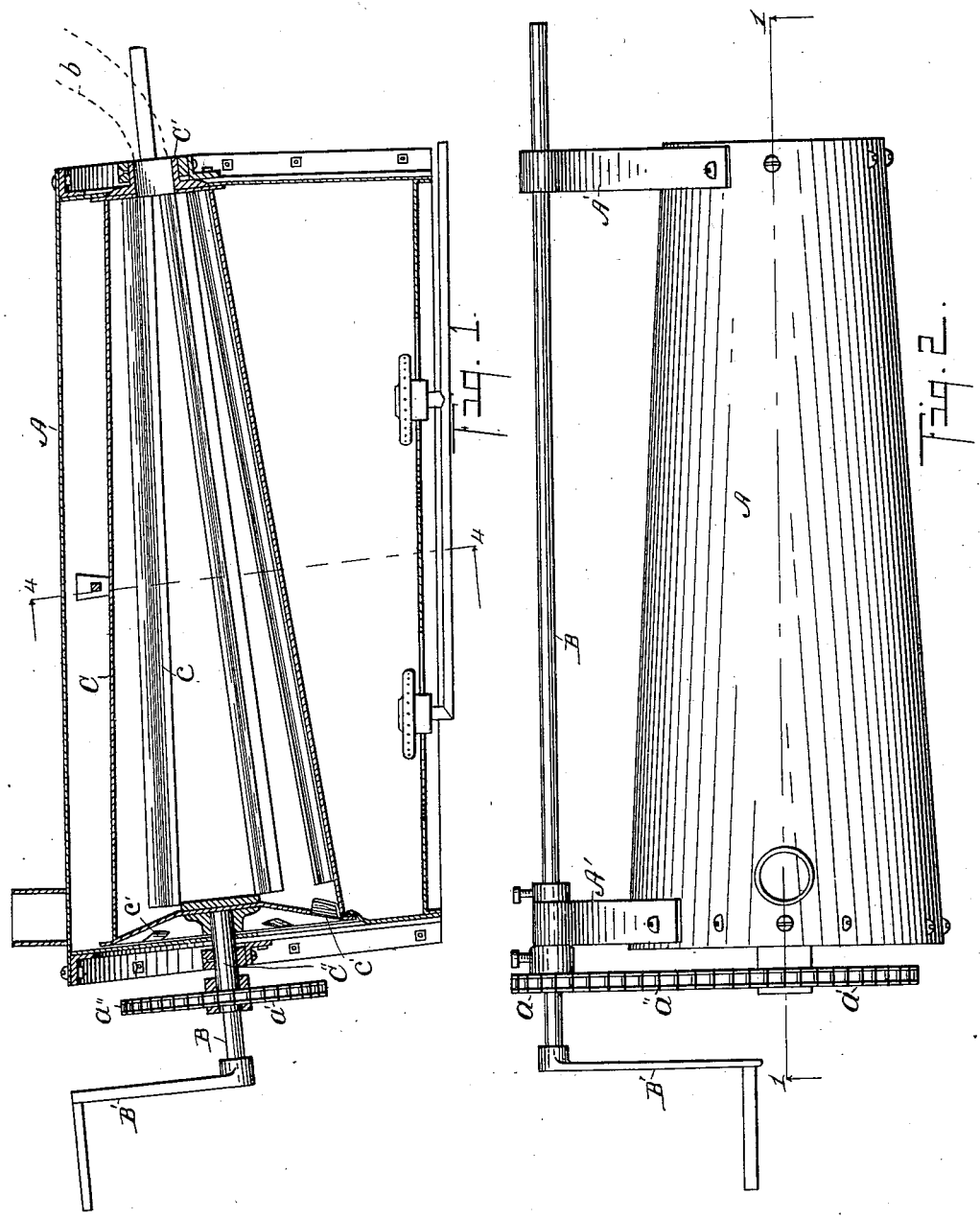
Witnesses:
Otis A. Earl
Ethel A. Teller
Inventor,
Israel B. Galbreath
By Fred L. Chappell
Att'y No. 730,757. PATENTED JUNE 9, 1903.
I. B. GALBREATH.
ROASTING OVEN.
APPLICATION FILED DEC. 15, 1902.
NO MODEL. 2 SHEETS—SHEET 2.
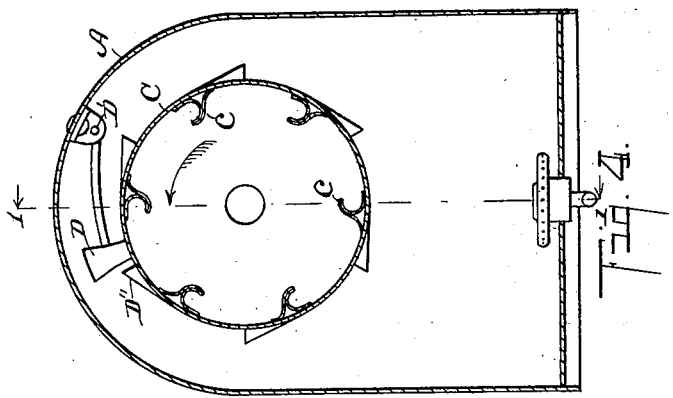
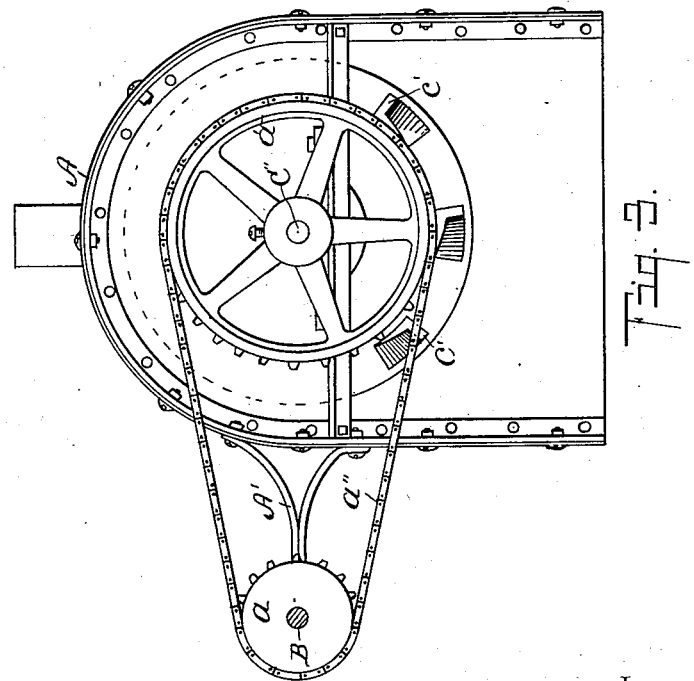
Witnesses: Inventor,
Otis A. Earl Israel B. Galbreath
Ethel R. Tiller By Fred L. Chappell
Att'y.

No. 730,757. Patented June 9, 1903.

UNITED STATES PATENT OFFICE.

ISRAEL B. GALBREATH, OF BATTLECREEK, MICHIGAN, ASSIGNOR OF TWO-THIRDS TO FRANK B. PURDY AND JAMES A. SHOULDIER, OF BATTLECREEK, MICHIGAN.

ROASTING-OVEN.

SPECIFICATION forming part of Letters Patent No. 730,757, dated June 9, 1903.

Application filed December 15, 1902. Serial No. 135,289. (No model.)

*To all whom it may concern:*

Be it known that I, ISRAEL B. GALBREATH, a citizen of the United States, residing at the city of Battlecreek, in the county of Calhoun and State of Michigan, have invented certain new and useful Improvements in Roasting-Ovens, of which the following is a specification.

This invention relates to improvements in baking or roasting ovens for the preparation of cereal foods.

The objects of the invention are to provide an efficient oven for the purpose of baking or roasting such foods, which are usually in the form of light flakes, without unduly agitating the flakes, and thereby breaking them up into small particles; second, to provide an efficient oven which shall deliver the said light flakes through the same, thereby insuring that the same shall be evenly baked to a uniform color and consistency without danger of any part or particles of the food remaining an unnecessary length of time in the oven to become blackened and burned.

Another object is to insure an even and free delivery of the materials through the oven without permitting drafts of air to pass through the same, thereby insuring a constant and even temperature.

Further objects, relating to details of construction, will definitely appear in the detailed description to follow.

I accomplish the objects of my invention by the devices and means described in the following specification.

The invention is clearly defined, and pointed out in the claims.

A structure embodying the features of my invention is fully illustrated in the accompanying drawings, forming a part of this specification, in which—

Figure 1 is a vertical longitudinal sectional detail elevation through my improved roasting-oven, taken on a line corresponding to line 1 1 of Figs. 2 and 4. Fig. 2 is a plan view of the structure appearing in Fig. 1. Fig. 3 is an end elevation taken from the left-hand end of Figs. 1 and 2. Fig. 4 is a transverse detail sectional elevation taken on a line corresponding to line 4 4 of Fig. 1.

In the drawings all of the sectional views are taken looking in the direction of the little arrows at the ends of the section-lines, and similar letters of reference refer to similar parts throughout the several views.

Referring to the lettered parts of the drawings, A is the external casing of my improved oven, provided with a suitable stack through which a current of heated air is caused to pass or within which a suitable fire is kindled for heating the internal cylinder C. The internal cylinder C is made somewhat conical in form, the axis of which is slightly inclined. The upper front end of this cylinder is provided with a hollow trunnion $C'$, into which any suitable spout, as $b$, (indicated in dotted lines,) introduces a quantity of the food or flaked cereal to be baked. Within the cylinder are longitudinal ribs $c$, which are curved in the same direction and form longitudinal cups, preferably the entire length of the cylinder, so that as the cylinder revolves these cups will take up a quantity of the flakes or other food to be baked and pass it upward till the cups approach the upper position, when the flakes thus carried up will be discharged and drop downwardly at an angle, and will thus be advanced slightly forward through the cylinder at each one-half revolution. To insure the prompt discharge from these cups, a light hammer D is pivoted at $D'$ within the main casing A and passes over cam-like lugs $D''$ on the side of the cylinder C, thereby insuring a constant tapping of the same, which causes the flakes to fall, as before stated. The lower end of this cylinder is provided with a central shaft $C''$, which extends through a suitable boxing in the end of the casing. On this shaft is a sprocket-wheel $a'$, over which extends a sprocket-chain $a''$ to a driving-sprocket $a$ on a shaft B to one side of and parallel with the axis of the cylinder, whereby the cylinder can be slowly rotated by a person at one side of the main casing, a suitable crank being provided on the end of the shaft B, the shaft being supported on suitable brackets $A'$ $A'$ on the side of the main casing.

In the discharge end of the cylinder C are a number of apertures $c'$, formed by striking tongues inwardly in the sheet-metal head to such an extent as to form an aperture through which flakes can gradually fall during the rotation of the cylinder and be thereby discharged from the baking-cylinder C within.

It will thus be seen that in operation this improved roasting-oven is continuous—that is, a stream of food can flow in through the hollow trunnion at C' and be gradually discharged at the lower end through the apertures c', thus making the operation very rapid and insuring an even heating of the flakes and a ready inspection of the same in the process of manufacture, so that if the flakes are noticed to be not sufficiently cooked the movement of the oven can be lessened and exactly the right color be effected by simply keeping watch of the flakes discharging from the oven.

Having thus described my invention, what I claim as new, and desire to secure by Letters Patent, is—

1. In a roasting-oven for cereal foods, the combination of the outer casing A; a closed revoluble cylinder C within, larger at the discharge end, supported by a hollow trunnion at its receiving end; longitudinal internal ribs within the cylinder, curved in the same direction to form cup-shaped longitudinal pockets; outwardly-projecting lugs on said cylinder; a hammer pivoted to the outer casing and adapted to drop over said lugs, to jar the same as it is revolved; a central shaft at its lower end, with means for revolving the cylinder; discharge-apertures, formed by forcing tongues of the metal of the head inward near its periphery, whereby the material will be discharged gradually as the roasting-cylinder is revolved; and suitable means of supplying heat within the outer casing.

2. In a roasting-oven for cereal foods, the combination of the outer casing A; a closed revoluble cylinder C within, larger at the discharge end, supported by a hollow trunnion at its receiving end; longitudinal internal ribs within the cylinder, curved in the same direction to form cup-shaped longitudinal pockets; a central shaft at its lower end, with means for revolving the cylinder; and discharge-apertures, formed by forcing tongues of the metal of the head inward, near its periphery, whereby the material will be discharged gradually as the roasting-cylinder is revolved; and suitable means of supplying heat within the outer casing.

3. In a roasting-oven for cereal foods, the combination of the outer casing A; a closed revoluble cylinder C within; longitudinal internal ribs within the cylinder, curved in the same direction, to form cup-shaped longitudinal pockets; outwardly-projecting lugs on said cylinder; a hammer pivoted to the outer casing and adapted to drop over said lugs to jar the same as it is revolved; a central shaft at its lower end with means for revolving the cylinder; discharge-apertures formed by forcing tongues of metal of the head inward near its periphery, whereby the material will be discharged gradually as the roasting-cylinder is revolved; and suitable means of supplying heat within the outer casing.

4. In a roasting-oven for cereal foods, the combination of the outer casing A; a closed revoluble cylinder C within; longitudinal internal ribs within the cylinder, curved in the same direction, to form cup-shaped longitudinal pockets; a hollow trunnion to support the upper end through which to feed material; a central shaft at its lower end, with means for revolving the cylinder; discharge-apertures formed by forcing tongues of the metal of the head inward near its periphery, whereby the material will be discharged gradually as the roasting-cylinder is revolved; and suitable means of supplying heat within the outer casing.

5. In a roasting-oven for cereal foods, the combination of the outer casing A; a closed revoluble cylinder C within; longitudinal internal ribs within the cylinder, curved in the same direction, to form cup-shaped longitudinal pockets; a feed-aperture at the upper end of said cylinder; a central shaft at its lower end, with means of revolving the cylinder; discharge-apertures formed by forcing tongues of the metal of the head inward near its periphery, whereby the material will be discharged gradually as the roasting-cylinder is revolved; and suitable means of supplying heat within the outer casing.

6. In a roasting-oven for cereal foods, the combination of the outer casing A; a closed revoluble cylinder C within; larger at the discharge end, supported by a hollow trunnion at its receiving end; longitudinal internal ribs within the cylinder, curved in the same direction, to form cup-shaped longitudinal pockets; outwardly-projecting lugs on said cylinder; a hammer pivoted to the outer casing and adapted to drop over said lugs to jar the same as it is revolved; a central shaft at its lower end with means for revolving the cylinder; discharge-apertures; and suitable means for supplying heat within the outer casing.

7. In a roasting-oven for cereal foods, the combination of the outer casing A; a closed revoluble cylinder within, larger at the discharge end, supported by a hollow trunnion at its receiving end; longitudinal internal ribs within the cylinder, curved in the same direction, to form cup-shaped longitudinal pockets; a central shaft at its lower end, with means for revolving the cylinder; discharge-apertures; and suitable means of supplying heat within the outer casing.

8. In a roasting-oven for cereal foods, the combination of the outer casing A; a closed revoluble cylinder C within; longitudinal internal ribs within the cylinder, curved in the same direction, to form cup-shaped longitudinal pockets; a feed-aperture at the upper end of said cylinder; outwardly-projecting lugs on said cylinder; a hammer pivoted to the outer casing and adapted to drop over said lugs, to jar the same as it is revolved; a central shaft at its lower end, with means for revolving the cylinder; discharge-apertures; and suitable means of supplying heat within the outer casing.

9. In a roasting-oven for cereal foods, the combination of the outer casing A; a closed inclined revoluble cylinder C within; a feed-aperture at the upper end of said cylinder; longitudinal internal ribs within the cylinder, curved in the same direction, to form cup-shaped longitudinal pockets; a central shaft at its lower end, with means for revolving the cylinder; discharge-apertures at its lower end formed by punching tongues inwardly; and suitable means of supplying heat within the outer casing.

In witness whereof I have hereunto set my hand and seal in the presence of two witnesses.

ISRAEL B. GALBREATH. [L. S.]

Witnesses:
HENRY F. JACOBS,
BERNARD J. ONEN.